United States Patent [19]

Matsuda et al.

[11] Patent Number: 5,050,115
[45] Date of Patent: Sep. 17, 1991

[54] ELECTRONIC CALCULATOR

[76] Inventors: Eichika Matsuda, 808, Matsuzuka, Yamatotakada-shi, Nara-ken; Makoto Kado, 492, Minosho-cho, Yamatokoriyama-shi, Nara-ken, both of Japan

[21] Appl. No.: 490,523

[22] Filed: Mar. 2, 1990

Related U.S. Application Data

[63] Continuation of Ser. No. 133,294, Dec. 15, 1987, abandoned.

[30] Foreign Application Priority Data

Dec. 15, 1986 [JP] Japan ............................. 61-298178
Dec. 23, 1986 [JP] Japan ............................. 61-315500
Dec. 23, 1986 [JP] Japan ............................. 61-315501

[51] Int. Cl.⁵ .............................................. G06F 3/00
[52] U.S. Cl. .............................................. 364/709.07
[58] Field of Search ................. 364/709.07, 709.08, 364/709.14, 710.1, 710.11

[56] References Cited

U.S. PATENT DOCUMENTS

| | | | |
|---|---|---|---|
| 3,973,113 | 8/1976 | Goldsamt | 364/709.07 |
| 4,064,398 | 12/1977 | Kishimoto et al. | 364/709.07 |
| 4,081,859 | 3/1978 | Goldsam et al. | 364/709.07 |
| 4,100,603 | 7/1978 | Boyd | 364/771 |
| 4,282,514 | 8/1981 | Elkin et al. | 235/310 |
| 4,488,250 | 12/1984 | Lipsey et al. | 364/709.07 |
| 4,545,022 | 10/1985 | Hughins | 364/709.07 |
| 4,744,044 | 5/1988 | Stover et al. | 364/737 |
| 4,860,233 | 8/1989 | Pitchford | 364/709.07 |

Primary Examiner—Dale M. Shaw
Assistant Examiner—Tan V. Mai

[57] ABSTRACT

An electrical calculator includes an inputting element for inputting numerical data. This input may include at least first and second unit data which are in the same category but are different levels such that the first unit is higher in level than the second unit. The calculator inhibits the entering of the higher level unit data when the higher level unit data is inputted immediately after entering numerical data followed by a lower level unit data.

11 Claims, 8 Drawing Sheets

POINTER POSITION

NEXT KEY INPUT

NEXT KEY INPUT

NEXT KEY INPUT

ELECTRONIC CALCULATOR

This application is a continuation of application Ser. No. 133,294, filed on Dec. 15, 1987, now abandoned.

BACKGROUND OF THE INVENTION

1. Field of the Invention

The present invention r relates to an electronic calculator which is capable of changing the display between a decimal expression and a fraction expression. More particularly, the present invention relates to a calculator which displays the number in the fraction expression when the decimal part can be represented as $X/2^n$ (x is an integer; n is an integer), and displays the number in the decimal expression when the decimal part cannot be expressed by $X/2^n$.

2. Description of the Prior Art

An electronic calculator which is capable of converting between the decimal expression and the fraction expression is already available on the market. However, all such conventional calculators are designed to convert decimal representations to fractional representations, or vice versa, in response to the user's operation. These conventional calculators are designed to automatically convert between decimal expression and fraction expression according to the nature of the numerical values.

SUMMARY OF THE INVENTION

It is an essential object of the present invention to provide a calculator which uses the units of yards, feet and inches in which the unit having a higher level cannot be entered immediately after entering a number followed by the unit of a lower level.

It is also an essential object of the present invention to provide an electronic calculator which is capable of automatically selecting either a fraction or a decimal expression according to each numerical value.

In accomplishing these and other objects of the present invention, an electronic calculator comprises means for inputting a numerical data, means for inputting at least first and second unit data which are in the same category but in different levels such that the first unit is higher in level than the second unit, and means for inhibiting the entering of the first unit data when the first unit data is inputted immediately after entering a numerical data followed by the second unit data.

Furthermore, according to the present invention, an electronic calculator comprises means for inputting a numerical data, means for inputting dimensional data to be added to an inputted numerical data, the dimensional data being either one of a first, second or third order dimension, means for inputting an arithmetic operator for effecting a calculation among two or more numerical data inputted by the numerical inputting means, means for determining the dimension of a number which is a result of the calculation, and means for outputting the determined dimension together with the calculated result.

Moreover, according to the present invention, an electronic calculator comprises means for inputting and outputting a numerical data expressed by the use of a fraction, means for inputting and outputting a numerical data expressed by the use of a decimal point, display means for displaying inputted and calculated numerical data, means for multiplying a decimal part of a numeral by $2^n$, in which n is an integer, means for detecting whether or not the result of the multiplication contains a decimal part, and means for controlling the display means to show the numerical value in a decimal representation when it is detected that the multiplication result contains a decimal part, and to show the numerical value in a fraction representation when it is detected that the multiplication result contains no decimal part.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
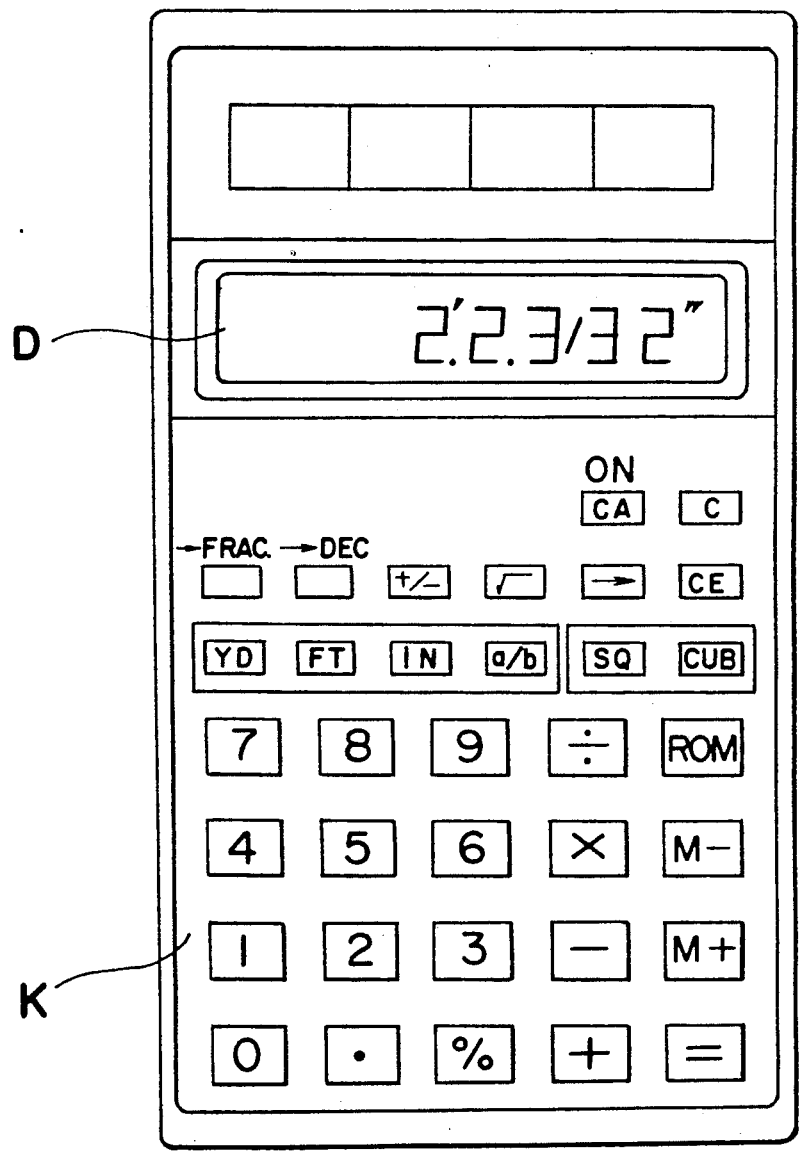
FIG. 1 is a top plan view of an electronic calculator according to a preferred embodiment of the present invention.

Before the description of the present invention proceeds, it is to be noted that like parts are designated by like reference numerals throughout the accompanying drawings.

FIG. 1 shows a top plan view of an electronic calculator according to one embodiment of the present invention.

The description given below is in relation to the application of the present invention to an electronic calculator which performs calculations in yards, feet and inches.

The functions with respect to each key on the keyboard are as follows:

| Key Identification | Function |
| --- | --- |
| YD | yard input |
| FT | foot input |
| IN | inch input |
| a/b | fraction input |
| SQ | area input |
| CUB | cubic volume input |
| DEC | converts fractions to decimals |
| FRAC | converts decimals to |

| Key Identification | Function |
|---|---|
| | fractions |

There are more keys, such as ten numerical keys for inputting numerical values, arithmetic operational keys, and a memory key, which are omitted from the description here because they are used in conventional manners.

A numerical value accompanied by a unit is inputted in the calculator by the depression of one or more numerical keys to input a number, and then, by the depression of one of the above-mentioned unit keys to input a unit. A calculation of a value accompanied by a unit is executed by inputting the numerical value accompanied by a unit and depressing one of the operational keys.

According to the electronic calculator of the present invention, there are a plurality of unit data to be entered which are in the same category, such as length, but in different levels, such as yard, foot and inch. Thus, it can be said that the unit yard is higher in level than the unit foot, and the unit foot is higher in level than the unit inch.

The result of the calculation is shown on the display D.

When the result of the calculation represents a length in terms of dimension, that is, when the calculation is "a length±a length", "a length×a number", "a length−an area", the electronic calculator according to the present invention will automatically display the result of the calculation under a fraction expression when the inches can be represented by $X/2^n$ (x is an integer and n is an integer), and in other cases, the calculator will automatically display the result under a decimal expression.

Figure 2:
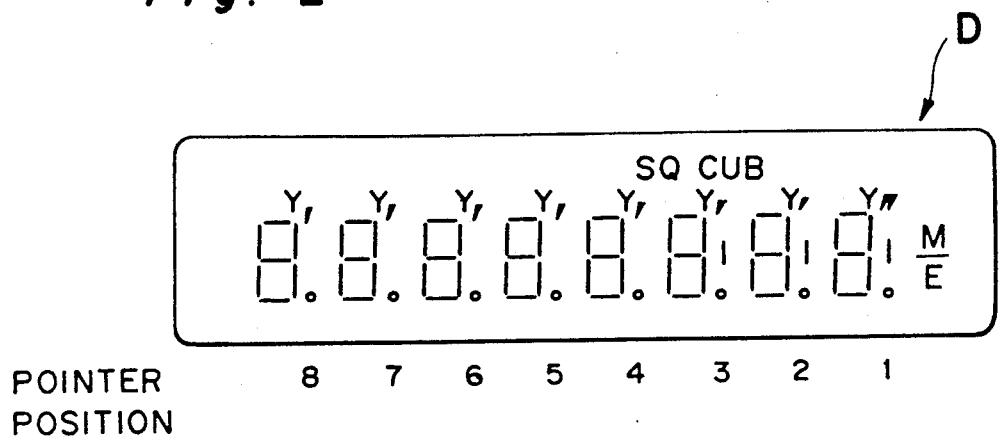
FIG. 2 is a fragmentary view of a display screen of the calculator of FIG. 1.

FIG. 2 shows a fragmentary view of the display D.

In the display D, segment electrodes are provided to show the following symbols on the display.

| Symbol | Signification |
|---|---|
| Y | indicating the unit "yard" |
| ' | indicating the unit "foot" |
| " | indicating the unit "inch" |
| / | indicating the line between the numerator and denominator |
| SQ | used when an area is computed or inputted |
| CUB | used when a volume is computed or inputted |

An example of the display under the expression mode is shown below.

2. '7"+9. ⅛"=3. "4. ⅛"

The result of the calculation 3.'4. ⅛", reads 3 feet 4⅛ inches.

An example of the display under the decimal expression mode is shown below.

3. '1. ⅛"−1. '2. 3"=2. '0. 2"

Figure 3:
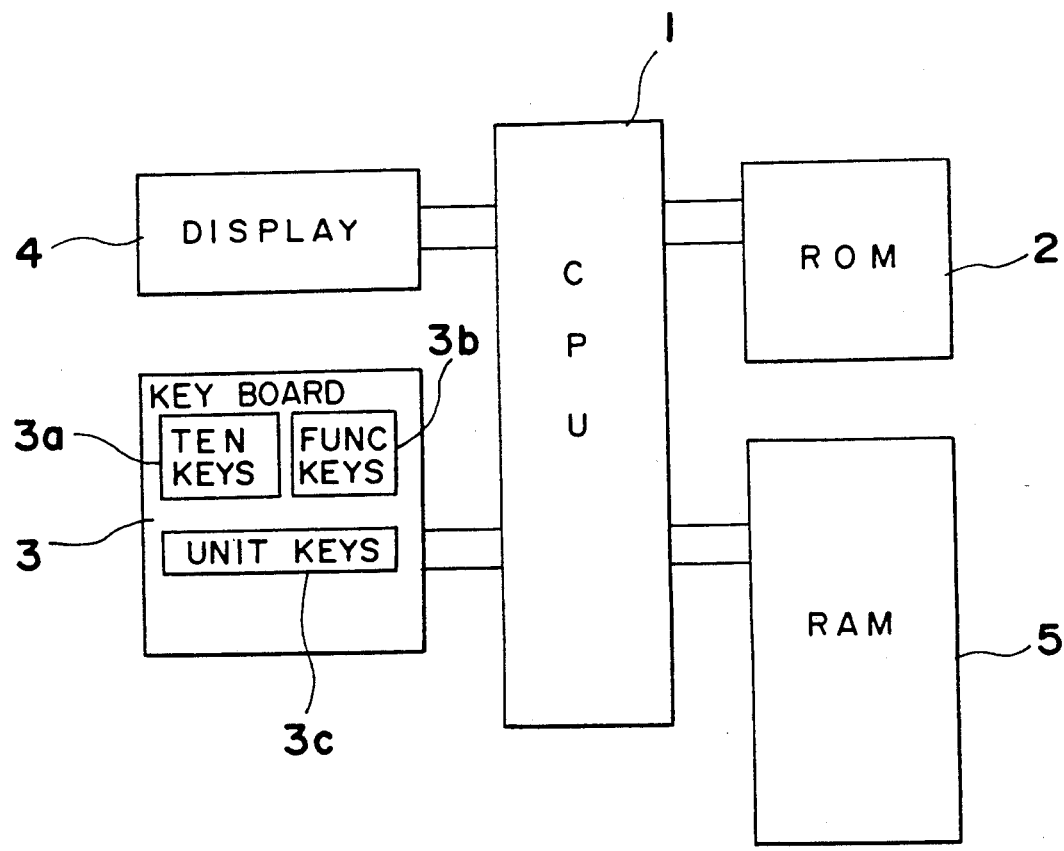
FIG. 3 is a block diagram of the electronic calculator shown in FIG. 1.

Referring to FIG. 3, a block diagram of an electronic calculator of the present invention is shown.

In FIG. 3, a CPU (central processing unit) 1 controls a keyboard unit 3 and a display unit 4 in accordance with a program stored in a ROM (read only memory) 2, and also the CPU 1 executes calculations of inputted data from the keyboard unit 3.

The inputted data, such as data used during operations or data obtained as a result of operations, etc., are stored in a RAM (random access memory) 5.

The CPU 1 outputs various data to the display unit 4 for displaying various information, such as the inputted number and the result of the calculation, etc., which are stored in RAM 5.

The keyboard unit 3 comprises ten keys 3a for inputting numbers, function keys 3b for inputting information for various arithmetic operations, and unit keys 3c for inputting units such as foot and inch.

When any of these keys 3a, 3b, or 3c are depressed, a signal corresponding to the depressed key is transmitted to CPU 1.

The data stored in ROM 2 is used to control keyboard unit 3 and display unit 4 and to perform various operations. CPU 1 performs various controls and operations as it reads out the stored information.

RAM 5 stores various kinds of information and is defined by a first operand register X for storing a number of a first operand, a first operand dimension register Xd for storing a dimension of the first operand, a second operand register Y for storing a number of a second operand, a second operand dimension register Yd for storing a dimension of the second operand, unit position registers YP and FP, an inch flag inF, and other registers and flags required for the internal process.

To prevent any error due to the depression of unit keys and/or the dimension keys in the wrong sequence, from being entered, subroutines are provided as will be described below with reference to the flowcharts of FIGS. 4–10.

(1) Unit Keys

The units must be entered in the order of the higher unit to the lower unit, that is, yard, foot, to inch. Accordingly, the unit "foot", for example, cannot be entered before entering the unit "yard", or in another example, after entering the unit "inch", no other units can be entered. Accordingly, the following rules are made.

(a) The control unit is so programmed to inhibit the entering of an unit which is higher than the unit already entered. In other words, the entering of a higher unit is not accepted.

(b) However, it is permitted to re-enter an unit which is different from the unit already entered just before, in the case when the user wishes to change the previously entered unit.

(2) Dimension Keys

The area or the volume is not expressed using two or more different units. In other words, the expression 21.5 yards$^2$ is permissible, but the expression 21 yards$^2$, 4.5 feet$^2$ is not permissible. Furthermore, when an arithmetic calculation is to be carried out, the first and second operands must have the same units. For example, 200 yards$^2$−2 yards$^2$, or 200 yards $^1$−2 yards, are permissible. This is because the units for areas or volumes have a different interchanging relationship from those for lengths, such as 1 yard=3 feet 1 yard$^2$=9 feet$^2$. Accordingly, only one unit is permitted to be used in entering an area or a cubic volume. Therefore, the following rule is made.

(c) To enter an area or a volume, the data therefor must be inputted in the order of numerical key, "SQ" or "CUB" key, and unit key.

In other words, after a unit key has been depressed and entered, the depression of the "SQ" or "CUB" Key cannot be entered.

(3) Fraction Keys

Since it is meaningless to represent a value in a fraction before entering the lowest unit, the fraction expression is permitted only when the lowest unit is entered. Accordingly, the following rule is made.

(d) Once the keys have been depressed to enter a fraction and a unit, no more numerals can be entered.

The flowcharts of FIGS. 4 to 10 are based on rules (a) through (d) specified above.

The meanings of the variables used in the flowcharts are defined as follows.

X: display register for storing a numerical data which is shown on the screen of display unit 4.

SLP: display pointer for indicating a slash "/" in a fraction shown on the display. No indication will be given when SLP is "0". (The pointer positions are indicated in FIG. 2.)

YP: display pointer for indicating the position of a unit symbol, "yard", shown on the display. No indication will be given when YP is "0".

FP: display pointer for indicating the position of a unit symbol, "foot", shown on the display. No indication will be given when FP is "0".

Xd: data representing the dimension of the numeral stored in display register X. When Xd=0, "no unit"; Xd=1, "length"; Xd=2, "area"; and Xd=3, "volume".

inF: display flat for indicating an unit symbol, "inch", when inF is "1", unit symbol of "inch" is displayed. No indication will be given when inF is "0".

It is to be noted that, a number just entered by the depression of one of the following ten keys is displayed at the most right-hand end segment of the display D (FIG. 2), and the number(s) which are already entered shift one place toward the left-hand direction, as in a usual calculator.

Each of the flowcharts shown in FIGS. 4–10 will be explained in detail below.

Figure 4:
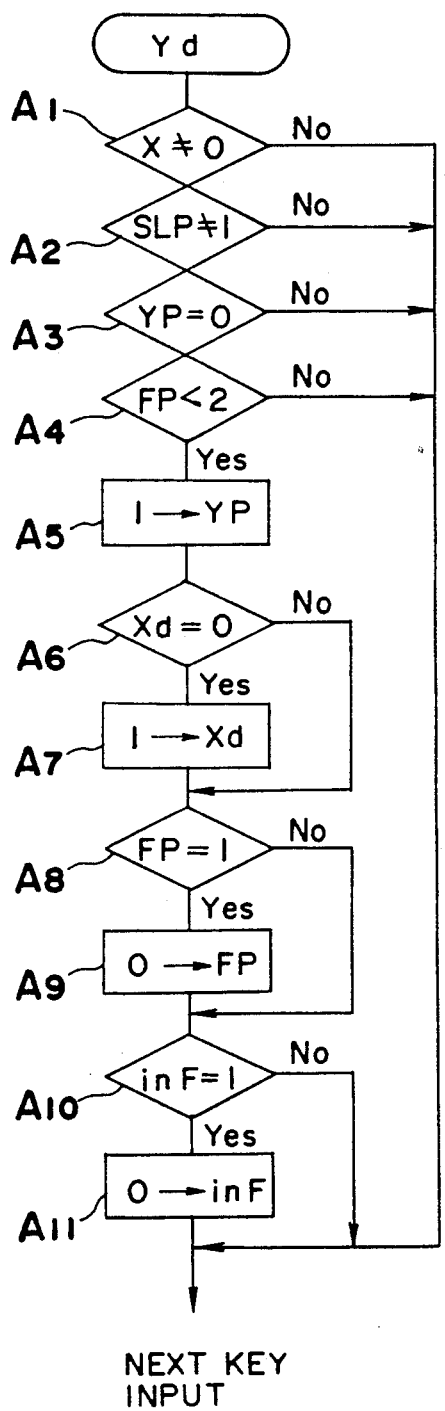
FIG. 4 is a flowchart for entering yard unit data.

Flowchart of FIG. 4

When the "YD" key is depressed, it is determined whether or not display register X is "0" (step A1), whether or not display pointer SLP is "1" (step A2), whether or not display pointer YP is "0" (step A3), and whether or not display pointer FP is less than 2 (step A4).

When X is "0" at step A1 or when display pointer SLP is "1" at step A2, the calculator proceeds to the next routine to detect and process the next key input.

Furthermore, when display pointer YP is determined as not being "0" at step A3, meaning that the yard input unit has already been inputted, the calculator proceeds to the next routine to detect and process the next key input.

When the display pointer FP, indicating the position of the symbol of the unit "foot" on the display, is 2 or a higher number at step A4, it means that at least one number has been entered by the depression of one of the ten keys, after the depression of the "FT" key. In such a case, the calculator proceeds to the next routine to detect and process the next key input without executing step A5, which is provided for entering the unit yard. In this manner, rule (a) is realized. In other words, when a unit foot is already provided, and thereafter, at least one numeral is entered, the calculator no longer permits the entry of the unit yard by the depression of the "YD" key.

On the contrary, when the display pointer FP is 1 or 0, the calculator goes to step A5 to make display pointer YP equal to "1". Thus, the unit yard is entered.

At step A6, whether or not the dimension Xd is 0 is determined. If Xd is 0, dimension Xd is made equal to 1 (step A7), so that the entered number will be provided with a symbol showing the dimension of the length.

At step A8, whether or not the display pointer FP is "1" is determined, If the display pointer FP is "1", "0" is entered into display pointer FP (step A9). Next, at step A10, whether or not the displaY flag inF is set is determined. If the display flat inF is set, the flag inF is reset, so that the inch unit will not be displayed. The calculator is then ready to detect the next key input.

As apparent from the above description, step A4 is provided for inhibiting the entering of the yard unit data when the yard unit data is inputted immediately after entering a numerical data followed by the foot unit data.

Figure 5:
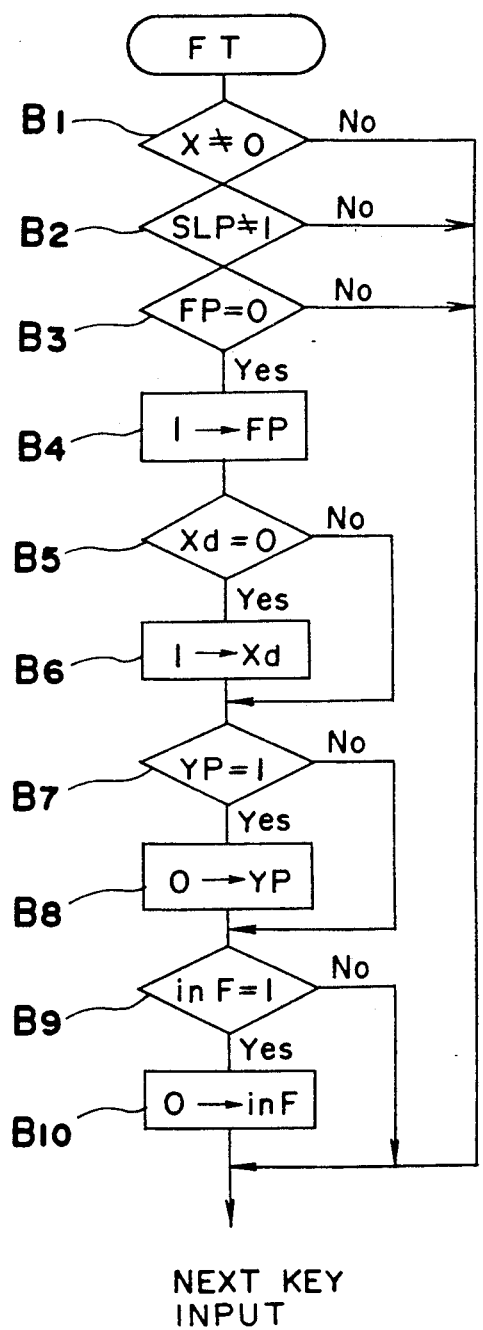
FIG. 5 is a flowchart for entering foot unit data.

Flowchart of FIG. 5

When the "FT" key is depressed, it is determined whether or not the register X is "0" (step B1), whether or not the display Pointer SLP is "1" (step B1), whether or not the displaY pointer FP is "0" (step B3).

When the register X is "0" at step B1, or when the display pointer SLP is "1" at step A2, the calculator proceeds to the next routine to detect and process the next key input.

If the display pointer FP is determined not to be "0" at step B3, the foot unit has already been inputted. Therefore, the calculator proceeds to the next routine to detect and processes the next key input.

Next, at step B4, the display pointer FP is loaded with "1". At step B5, whether or not dimension Xd is "0" is determined. If dimension Xd is 0, dimension Xd is made equal to 1 (step B6).

At step B7, whether or not the display pointer YP is "1" is determined. If the display pointer YP is "1", "0" is entered into the display pointer YP. At step B9, whether or not the display flag inF is set is determined. If the flag inF is set, the flag inF is reset so that the inch unit will not be displayed. The calculator is then ready to detect the next key input.

Figure 6:
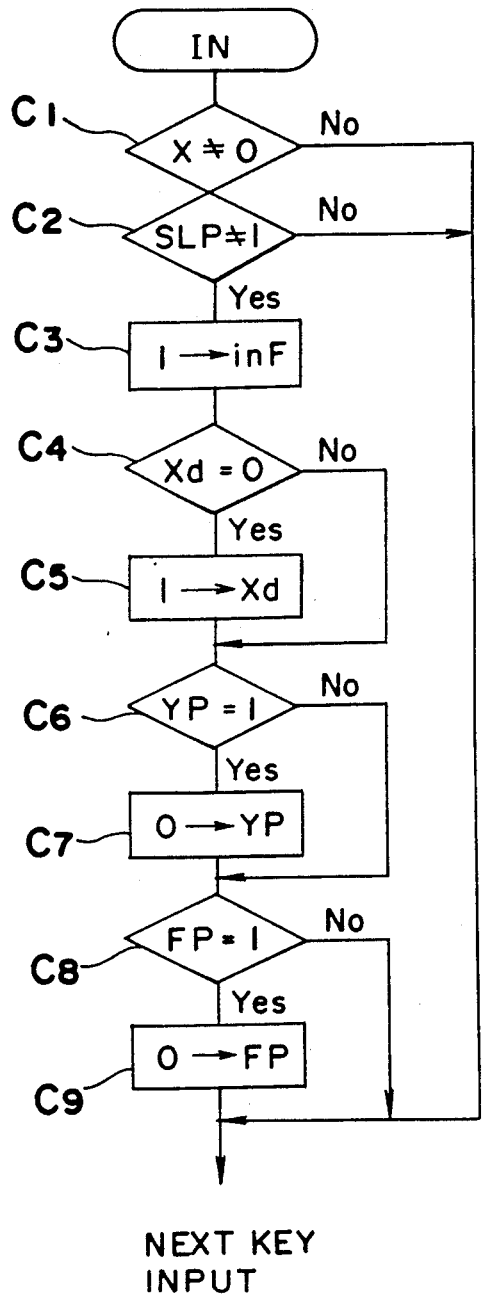
FIG. 6 is a flow chart for entering inch unit data.

Flowchart of FIG. 6

When the "IN" key is depressed, it is determined whether or not the register X is "0" (step C1) and whether or not the display pointer SLP is "1" (step C2).

When the register X is "0" at step C1 or when the display pointer SLP is "1" at step C2, the calculator is ready to detect the next key input.

At step C3, the display flag inF is set. At step C4, whether or not dimension Xd is 0 is determined. If dimension Xd is 0, 1 is entered into the dimension Xd (step C5.)

At step C6, whether or not the display pointer YP is "1" is determined. If the display pointer YP is "1", 0 is entered into the pointer YP (step C7). At step C8, it is determined whether or not the display pointer FP is "1". If the display pointer FP is "1", 0 is entered into the pointer FP. The calculator is then ready to detect the next key input.

In the program steps of FIG. 4 for entering the "YD" key, the determination of the status of the display flag inF is executed in the beginning. This is to permit the user to depress a unit key which is different from the one depressed immediately before, as described above. In other words, the calculator is not permitted to enter any numerical keys after the unit "inch" has been entered, as will be explained later. It is sufficient, therefore, for the display unit 4 to show the inch indication only at the lowest pointer position.

Figure 7:
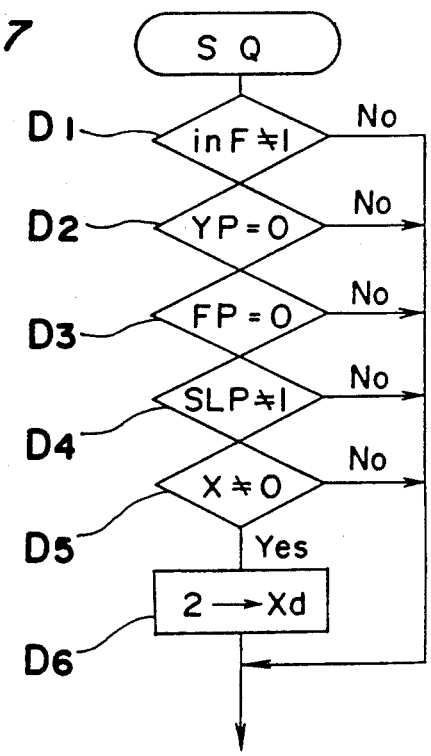
FIG. 7 is a flowchart for entering a dimension representing square area.

Flowchart of FIG. 7

When the "SQ" key is depressed, it is determined whether or not the display flag inF is 0 (step D1), whether or not the display pointer YP is "0" (step D2), whether or not the display pointer FP is "0" (step D3), whether or not the display pointer SLP is "1" (step D4), and whether or not the display register X is "0" (step D5).

If the flag inF is 1 at step D1, or the display pointer YP is not 0 at step D2, or the display pointer FP is not 0 at step D3, the calculator is ready to detect the next key input. In this manner, rule (c) is realized.

Also, when the display pointer SLP is 1 or when the display register X is 0, the calculator is ready to detect the next key input.

When the calculator has moved to step D6, the dimension Xd is made equal to 2 so that the entered number will be provided with a symbol showing the dimension of area.

Figure 8:
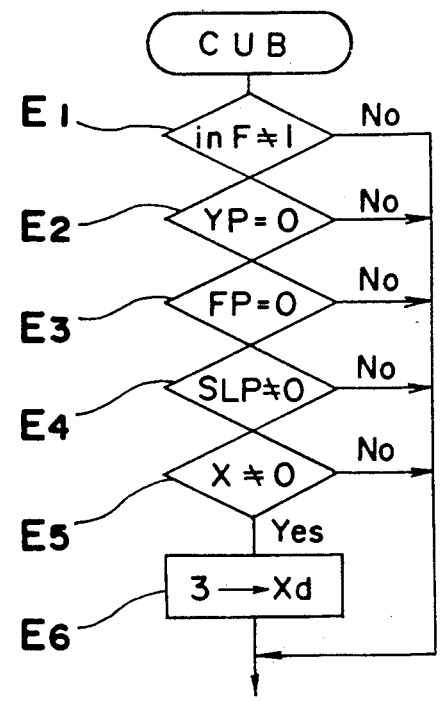
FIG. 8 is a flowchart for entering a dimension representing cubic volume.

Flowchart of FIG. 8

When the "CUB" key is depressed, it is determined whether or not the display flag inF is 0 (step E1), whether or not the display pointer YP is 0 (step E2), whether or not the display Pointer FP is 0 (step E3), whether or not the display pointer SLP is 1 (steP E4), and whether or not the display register X is 0 (step E5).

If the flag inF is 1 at step E1, or the display pointer YP is not 0 at step E2, or the display pointer FP is not 0 at step E3, the calculator is ready to detect the next key input. In this manner, rule (c) is realized.

Also, when the display pointer SLP is 0 or when the display register X is 0, the calculator is ready to detect the next key input.

When the calculator has moved to step F6, the dimension Xd is made equal to 3 so that the entered number will be provided with a symbol showing the dimension of cubic volume.

Figure 9:
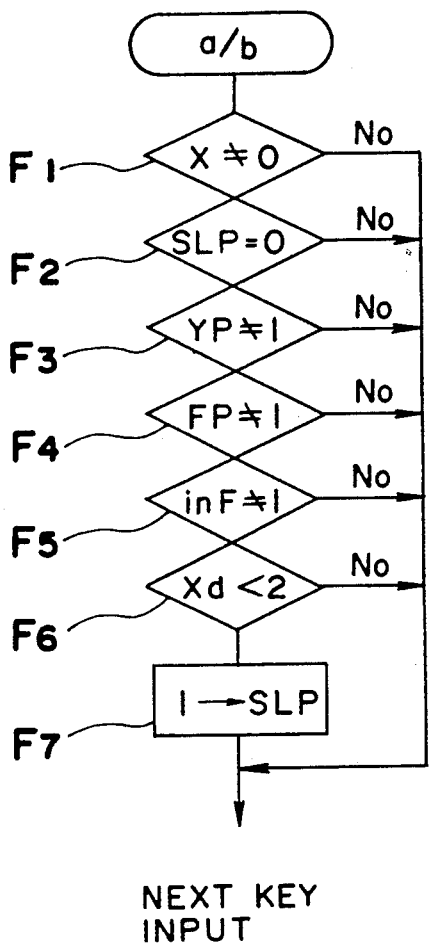
FIG. 9 is a flowchart for entering a slash for use in indicating a fraction.

Flowchart of FIG. 9

When the "a/b" key is depressed, it is determined whether or not the display register X is 0 (step F1), whether or not the display pointer SLP is 0 (step F2), whether or not the display pointer YP is 1 (step F3), whether or not the display pointer FP is 1 (step F4), whether or not the display flag inF is 1 (step F5), and whether or not the dimension Xd is less than 2 (step F6).

If the register X is 0 at step F1, or the pointer SLP is not 0 at step F2, or the pointer YP is 1 at step F3, or the pointer FP is 1 at step F4, or the flag inF is 1 at step F5, the calculator is ready to detect the next key input.

When the calculator has moved to step F7, 1 is entered into the display pointer SLP.

Figure 10:
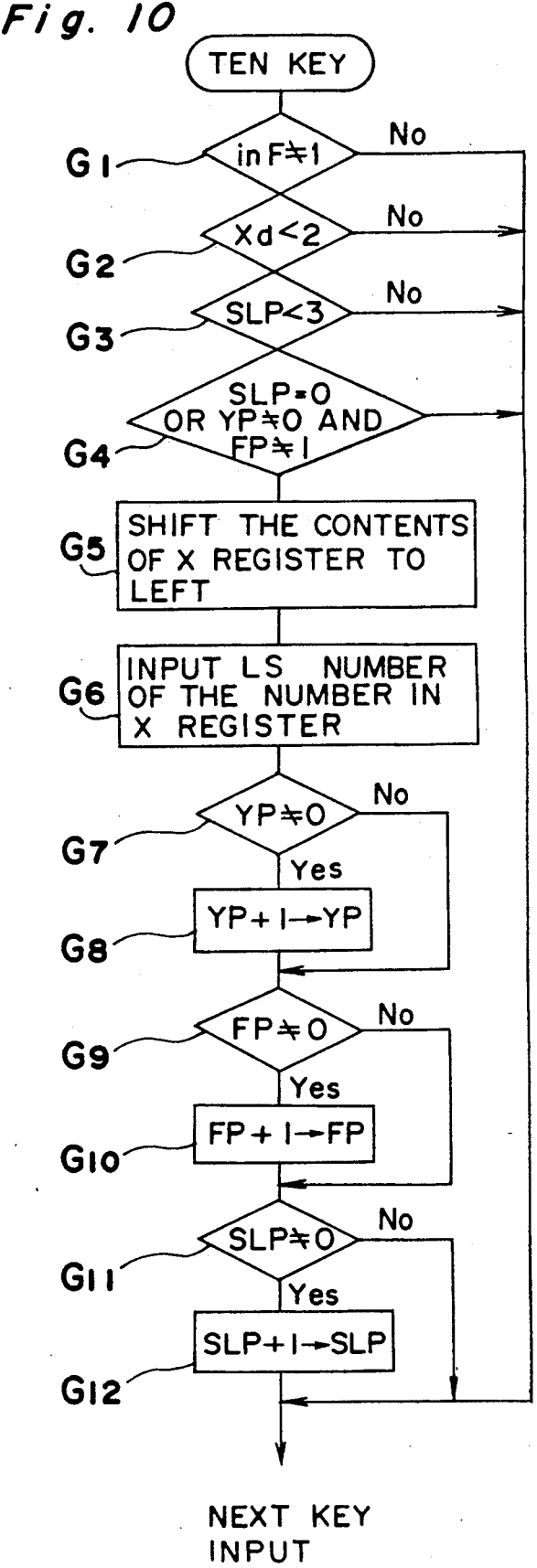
FIG. 10 is a flowchart for entering numeric data.

Flowchart of FIG. 10

When the ten numerical keys are depressed, it is determined whether or not the display flag inF is 1 (step G1), whether or to the dimension Xd is less than 2 (step G2), whether or not the display pointer SLP is less than 3 (step G3), and whether or not the display pointer SLP is 0, or if the display pointer YP is not 1 and at the same time if the display pointer FP is not 1 (step G4).

If the display flag inF is at step G1, the calculator is ready to detect the next key input. This is to prevent the entering of any numerical key after the inch unit is entered.

If the dimension Xd is equal to or greater than 2 at step G2, or if the display pointer SLP is equal to or greater than 3 at step G3, the calculator is ready to detect the next key input.

At step G4, if the pointer SLP is 0, or if the pointer YP is not 1 and at the same time the pointer FP is not 1, the calculator is ready to detect the next key input. In this manner, rule (d) is realized.

At step G5, the contents of the display register X are shifted to the left to be displayed in the next segment located on the left side.

At step G6, the numeral inputted by depressing one of the ten keys is entered at the lowest place in the display register X as a least significant number.

At step G7, it is determined whether or not the display pointer YP is 0. If the pointer YP is 0, 1 is loaded into the pointer YP (step G8).

At step G9, it is determined whether or not the display pointer FP is 0. If the pointer FP is 0, 1 is loaded into the pointer FP (step G10).

At step G11, it is determined whether or not the display pointer SLP is 0. If the pointer SLP is 0, 1 is loaded into the pointer SLP.

The functions of the calculator as described above can be summarized as follows.

Firstly, when data is inputted in the order of: first number data, first unit data, second number data, second unit data, third number data and third unit data;

it is necessary that the first unit has the highest level, the second unit has the next highest level and the third unit has the lowest level, and that the first and second numbers cannot be a fraction or a decimal. In the above example, it is possible to delete the inputting of the first number data, first unit data, second number data, and second unit data.

It is to be noted that the first number data is inputted by the depression of at least one of the ten numerical keys. The second and third number data are inputted in the same manner. Also, the first, second and third units are inputted, according to the above embodiment, by the depression of the yard key, foot key, and inch key, respectively.

According to the present invention, the units are not restricted to those described above, but other units can be used, such as units of meter, centimeter and millimeter for expressing length, or units of kilogram, gram and milligram for expressing weight.

Secondly, after numeric data is inputted, the dimension key and the unit key must be entered in the above order. It should be noted that the dimension key and the unit key cannot be entered in an opposite order. Also, when inputting a value with a unit, specifically an area or a cubic volume only one unit can be inputted.

Furthermore, when a fraction is entered, and thereafter, a unit is entered, it is impossible to input any other number of unit.

When numerical values and units are inputted alternately in series to the electronic calculator of the present invention, the second or the third entered unit must be lower than the first or the second entered unit, respectively, or otherwise the calculator prevents the entry of the unit. For example, when values are inputted in yards, feet, and inches, if the value in feet is inputted first, the value in yards cannot be inputted thereafter, according to the present invention. Units cannot be inputted unless a higher unit precedes a lower unit; therefore, no error will occur in the order in which units are inputted.

Figure 11:
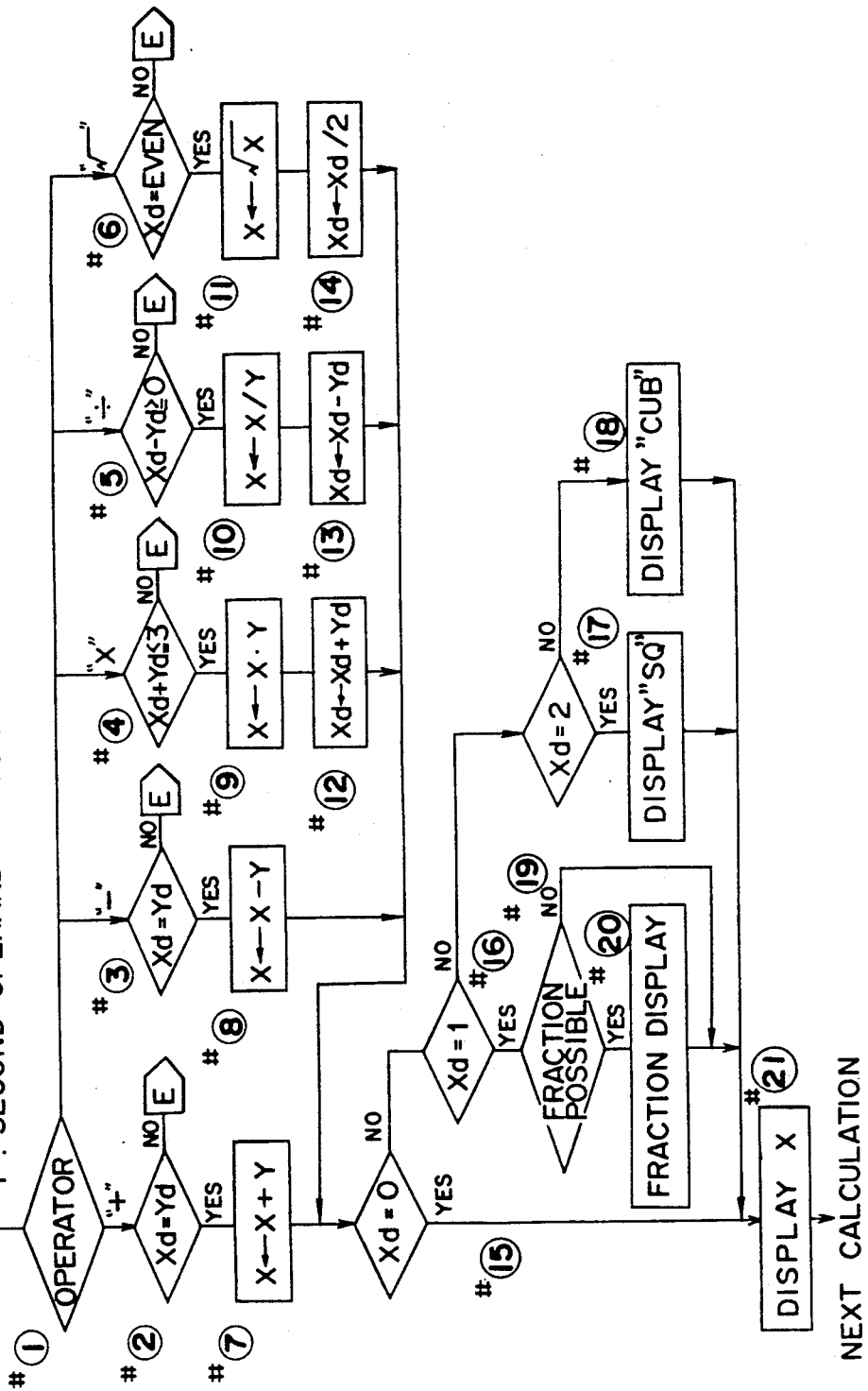
FIG. 11 is a flowchart for calculating dimensions and for automatically displaying a numeral in a fraction representation.

Referring to FIG. 11, a flowchart showing the details of a procedure is illustrated.

Examples are now given with respect to operations for arithmetic calculations, and also an operation for taking a square root.

The first operand is stored in the register X and the second operand is stored in the register Y. Furthermore, the dimension number of the first operand is stored in the register Xd and that of the second operand is stored in the register Yd. The dimension number is 0 when the operand refers to a dimensionless number; the dimension number is 1 when the operand refers to a length; the dimension number is 2 when the operand refers to an area; and the dimension number is 3 when the operand refers to a volume.

First, before an operation is carried out, the type of the arithmetic operator is determined (step #1).

The calculator executes step #2 when the arithmetic operator is for addition, step #3 when the arithmetic operator is for subtraction, step #4 when the arithmetic operator is for multiplication, step #5 when the arithmetic operator is for division, and step #6 when the arithmetic operator is for finding a square root.

As described above, the procedures differ according to the type of arithmetic operator, and it is determined as described below, whether or not the dimension of the first operand and that of the second operand are acceptable.

When the detected arithmetic operator is for addition, it is determined whether or not the dimension of the first operand stored in the register Xd is identical with the dimension of the second operand stored in the register Yd (step #2).

Similarly, when the detected arithmetic operator is for subtraction, it is determined whether or not the dimension is identical between the first and second operands, as carried out in the same manner described above (step #3).

When the detected arithmetic operator is for multiplication, it is determined whether or not the sum of the dimension number of the first operand stored in the register Xd and that of the second operand stored in the register Yd, represented as (Xd+Yd) is equal to or less than 3. When the sum is equal to 3, the result will represent a cubic volume; when the sum is equal to 2, the result will represent an area; when the sum is equal to 1, the result will represent a length; and when the sum is equal to 0, the result will represent a dimensionless number. When the sum exceeds 3, the result will be meaningless, and an error is shown on the display.

When the detected arithmetic operator is for division, it is determined whether or not the difference between the dimension number of the first operand stored in register Xd and that of the second operand stored in register Yd, represented as (Xd−Yd), is equal to or greater than 0.

When the detected arithmetic operator is for finding the square root, it is determined whether or not the dimension of the first operand stored in the register Xd is equal to an even number.

When the dimension numbers of both the first and second operands have been determined to be acceptable in step #2, #3, #4, #5, or #6, the calculator executes steps #7, #8, #9, #10, or #11, respectively.

Figure 12:
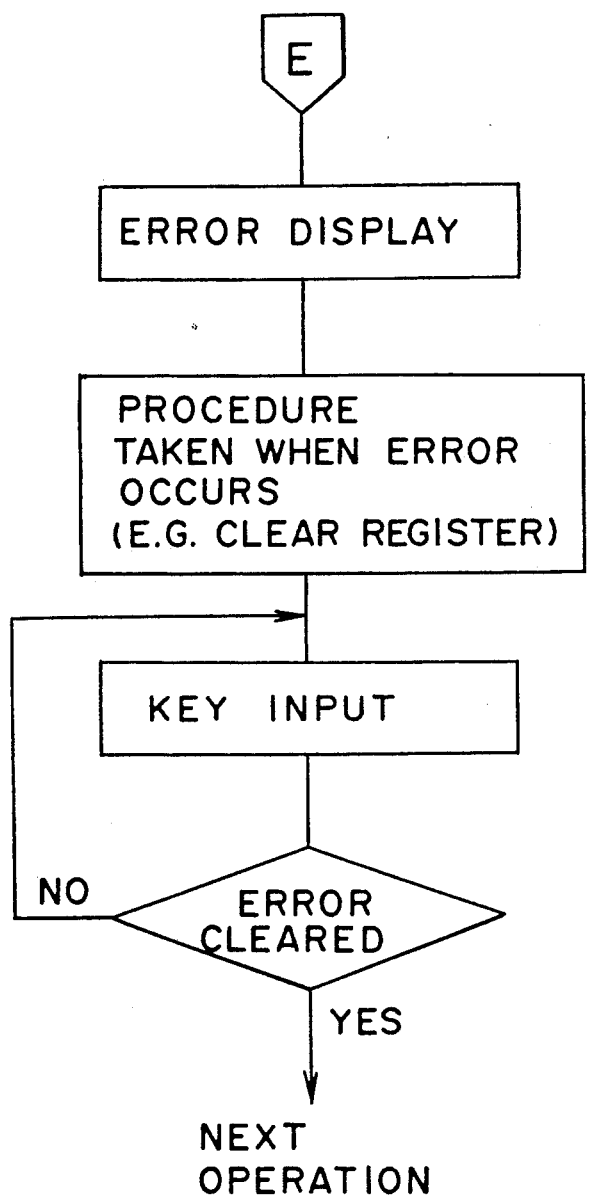
FIG. 12 is a flowchart showing an error routine shown in FIG. 11.

If the dimension number is found to be unacceptable with respect to the first and second operands in any one of steps #2, #3, #4, #5, or #6, the calculator executes an error routine, which is shown in FIG. 12.

At step #7, the second operand stored in the register Y is added to the first operand stored in the register X, and the resultant sum is stored in the register X.

At step #8, the second operand stored in the register Y is subtracted from the first operand stored in the register X, and the resultant difference is stored in the register X.

At step #9, the first operand stored in the register X is multiplied by the second operand stored in the register Y, and the resultant product is stored in the register X. At step #12, the dimension number of the first operand stored in the register Xd is added to that of the second operand stored in the register Yd, and the resultant difference is stored in the register Xd.

At step #11, the square root of the first operand stored in the register X is found, and the obtained square root is stored in the register X. At step #14, the dimension number of the first operand stored in the register Xd is divided by 2, and the resultant quotient is stored in the register Xd.

As apparent from the above description, the operations of multiplication (step #12), division (step #13), and square root (step #14) require calculations (steps #12, #13 and #14) to obtain the dimension number to be used for the result of the arithmetic operation.

The results of the arithmetic operation are displayed in different styles, dePending on the dimension number. When the dimension number of the calculated result of the operation stored in the register Xd is 0, the display shows only the result of the operation stored in the register X (step #21).

When the dimension number of the calculated result of the operation stored in the register Xd is not 9, the operation moves to step #16, step #17, or step #18 according to the dimension number.

At step #19, it is determined whether or not a fractional representation is possible on the display, that is, whether or not the part following the decimal point of the result of the operation can be represented as a fraction in the form of $X/2^n$. When a fractional representation is possible, the fraction expression is selected so that the result of the operation stored in the register X is converted to a fractional representation (step #20). On the contrary, when the fractional representation is not possible, the decimal expression is selected so that the result of the operation stored in the register X is shown on the display (step #21) without conversion to the fractional representation.

When the dimension number of the result of the operation is 2, "SQ" will be shown through step #17 for the indication of the square.

When the dimension number of the result of the operation is 3, "CUB" will be shown through step #18 for the indication of the cube.

At step #21, the result of the operation is displayed, and thereafter, the calculator proceeds to the next operation.

On the display, the dimensionless numbers and the numbers representing the length can be distinguished such that the latter is shown with a unit, and the former is shown with no unit.

Figure 13:
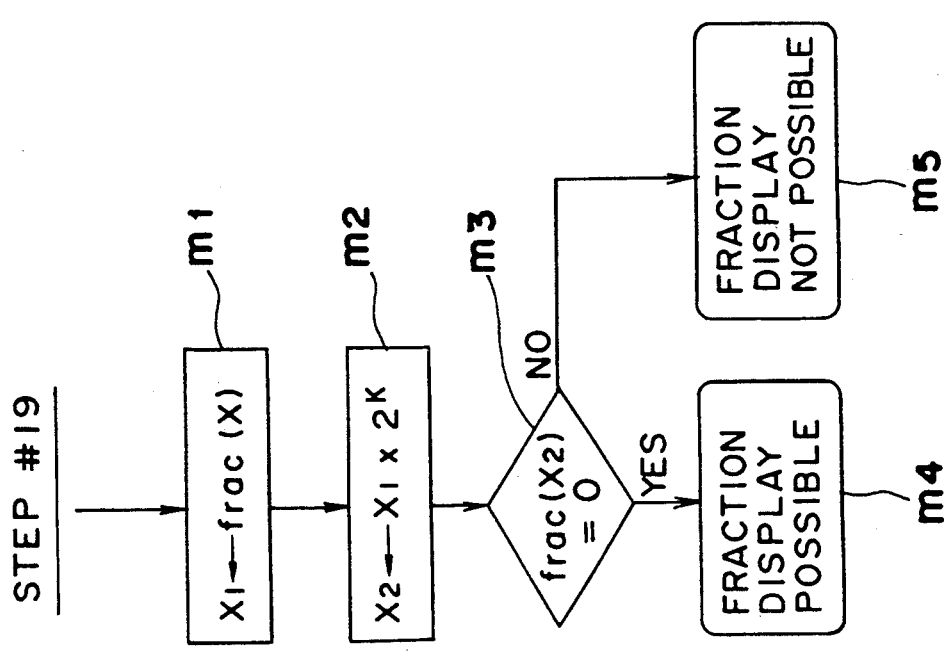
FIG. 13 is a flowchart showing step #19 shown in FIG. 11.

FIG. 13 illustrates the procedure of step #19. First, the decimal part of the number as stored in the register X is read out (step m1). In the drawing at step m1, frac (X) represents the decimal part (the part following the decimal point) of the number stored in the register X. The decimal part of the number is stored in the register X1. Next, at step m2, the decimal part stored in the register X1 is multiplied by $2^K$ and the product is stored in the register X2. Here, K represents a predetermined natural number arbitrarily chosen in such a manner as to make the largest possible denominator $2^K$. In the example described below, 6 was chosen for K so that the largest possible denominator would be 64 (K=6, $2^6$=64). Next, at step m3, it is determined whether or not the number stored in the register X2 contains a decimal part, that is, whether frac (X2) is 0 or not. When frac (X2)=0, a fractional representation is possible (step m4), and when frac (X2)=0, a fractional representation is not possible (step m5).

Figure 14:
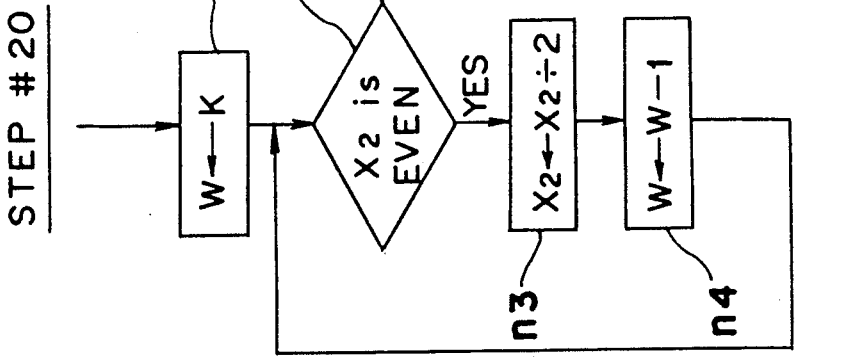
FIG. 14 is a flowchart showing step #20 shown in FIG. 11.

FIG. 14 shows a procedure of step #20. First, the value of the above-mentioned K is stored in the register W (step n1). Next, it is determined whether or not the number stored in the register X2 is an even number (step n2). When the number stored in the register X2 is an even number, the calculator executes step n3, where the number is divided by 2 (the numerator is divided by 2) and the resultant quotient is stored in the register X2. The calculator then executes step n4, where 1 is subtracted from the number stored in the register W (step n4). Since the denominator is $2^W$, the subtraction, W-1 as described above, is substantially equal to dividing the fraction by 2. The calculator then returns to step n2. Again, it is determined whether or not the number stored in the register X2 is an even number. When the number is determined not to be an even number, the number in the register X2 is no longer reducible by 2. The calculator then executes step n5 at which the value of the denominator $2^W$ is stored in the register X3 (step n5). Then, a fraction is displayed such that the value stored in the register X3 is displayed as the denominator; the value stored in the register X2 is displayed as the numerator; and the number stored in the register X is displayed as the integer (step n6).

An example for displaying the fraction will be given below.

It is determined whether or not 1.3125 (1-5/16) can be represented as a fraction by the flowchart of FIGS. 6 and 7. At step m1, 0.3125 will be stored in the register X1. At step m2, when K=6, $0.3125 \times 2^6 = 20$ is calculated and the result is stored in the register X2.

Since the number stored in the register X2 has no decimal part, the number stored in the register X can be expressed in the fraction (steps m3 and m5).

Next, since W=K (step n1) and X2 is an even number (step n2)

$$X2 = X2 - 2 = 10$$

and $$W = W - 1 = 5$$

are carried out at steps n3 and n4.

Therefore, when steps n2, n3 and n4 are repeated, it follows: X2 32 5, and W=4, to reach a condition that the number in the register X2 is no longer an even number. Thus, the program moves to step n5 in which the register X3 is stored with 16, as indicated below.

$$X3 = 2^W = 2^4 = 16$$

Therefore, X2=5 is obtained as a numerator, and X3=16 is obtained as a denominator, which are used for the fraction display on the screen.

Another example is when the given number is 13.83 (13-5/6). In this case, X1=0.83 and X2=53.3, so that it is so detected that the fractional expression using $2^K$ as a denominator is impossible.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An electronic calculator comprising:
   first input means for inputting numerical data;
   second input means for inputting at least a first unit data and a second unit data, said first and second unit data being assigned to a same operand but having different levels such that said first unit data is higher in level than said second unit data;
   display means, operatively connected to said first and second input means, for displaying said numerical data and the unit data;
   said display means including,
      a plurality of digit position means for displaying said numerical data, and
      a plurality of unit indicator means for displaying either said first unit data or said second unit data after any digit position; and
   first inhibit means for inhibiting entry of said first unit data when said first unit data is inputted immediately after entering numerical data followed by said second unit data for the same operand.

2. The electronic calculator as claimed in claim 1, wherein said second input means is arranged in input first, second and third unit data, said unit data being of a same category but having different levels such that said first unit data is higher in level than said second unit data and said second unit data is higher in level than said third unit data.

3. The electronic calculator as claimed in claim 2, wherein said first, second and third unit data represent yard, foot, and inch, respectively.

4. The electronic calculator as claimed in claim 1, further comprising:
   third input means for inputting numerical data expressed with a fraction; and
   second inhibit means for inhibiting entry of numerical data when said numerical data is inputted immediately after entering a unit data followed by numerical data expressed in a fraction.

5. The electronic calculator as claimed in claim 1, further comprising:
   third input means for inputting second order dimensional data and third order dimensional data; and
   second inhibit means for inhibiting entry of said second of the third order dimensional data immediately after entering a unit data.

6. The electronic calculator as claimed in claim 5, wherein said second order dimensional data is square area data and said third order dimensional data is cubic volume data.

7. The electronic calculator as claimed in claim 1, further comprising:
   third input means for inputting an arithmetic operator for causing a calculation among two or more entries of numerical data inputted by said first input means;
   calculating means for calculating a dimension of a number which is a result of said calculation; and
   output means for outputting the calculated dimension together with the calculated result.

8. The electronic calculator as claimed in claim 7, wherein said arithmetic operator comprises an operator for addition, an operator for subtraction, an operator for multiplication, an operator for division and an operator for finding a square root.

9. The electronic calculator as claimed in claim 8, wherein said calculating means adds the dimensional data of the inputted numerical data when said arithmetic operator is said operator for multiplication.

10. The electronic calculator as claimed in claim 8, wherein said calculating means subtracts the dimensional data of the inputted numerical data to obtain a difference when said arithmetic operator is said operator for division.

11. An electronic calculator comprising:
first means for inputting and outputting first numerical data expressed with a fraction;
second means for inputting and outputting second numerical data expressed with a decimal part;
display means for displaying the inputted and outputted first and second numerical data;
multiplying means for multiplying said decimal part of said second numerical data by $2^n$, n being an integer;
first detecting means for determining whether or not a product of the multiplication includes a decimal portion;
dividing means for dividing said decimal part of said second numerical data by $2^k$, k being an integer;
second detecting means for determining whether or not a quotient of the division is an even number; and
control means for controlling said display means to show numerical data in a decimal representation when said first detecting means determines that said product of the multiplication includes said decimal portion or when said second detecting means determines that the quotient of the division is not an even number;
said control means controlling said display means to show numerical data in a fraction representation when said fist detecting means determines that the product of the multiplication includes no decimal portion or when said second detecting means determines that the quotient of the division is an even number.

* * * * *

UNITED STATES PATENT AND TRADEMARK OFFICE
CERTIFICATE OF CORRECTION

PATENT NO. : 5,050,115
DATED : September 17, 1991
INVENTOR(S) : Eichika MATSUDA and Makoto KADO It is certified that error appears in the above-identified patent and that said Letters Patent is hereby corrected as shown below:

<u>On the title page</u>, item [73]

Please insert the Assignee as follows:

--SHARP KABUSHIKI KAISHA, 22-22 Nagaika-cho, Abeno-ku, Osaka, Japan--

Signed and Sealed this

Nineteenth Day of October, 1993

Attest:

BRUCE LEHMAN

*Attesting Officer*    *Commissioner of Patents and Trademarks*